United States Patent
Lutjen et al.

(10) Patent No.: US 11,073,034 B2
(45) Date of Patent: Jul. 27, 2021

(54) SEAL ASSEMBLY FOR SEALING AN AXIAL GAP BETWEEN COMPONENTS

(71) Applicant: United Technologies Corporation, Farmington, CT (US)

(72) Inventors: Paul M. Lutjen, Kennebunkport, ME (US); Timothy M. Davis, Kennebunk, ME (US); Mark J. Rogers, Kennebunkport, ME (US)

(73) Assignee: Raytheon Technologies Corporation, Farmington, CT (US)

(*) Notice: Subject to any disclaimer, the term of this patent is extended or adjusted under 35 U.S.C. 154(b) by 249 days.

(21) Appl. No.: 16/386,640

(22) Filed: Apr. 17, 2019

(65) Prior Publication Data
US 2020/0025008 A1  Jan. 23, 2020

Related U.S. Application Data

(62) Division of application No. 14/866,197, filed on Sep. 25, 2015, now Pat. No. 10,301,956.

(60) Provisional application No. 62/055,352, filed on Sep. 25, 2014.

(51) Int. Cl.
| | |
|---|---|
| *F01D 11/02* | (2006.01) |
| *F01D 11/00* | (2006.01) |
| *F16J 15/08* | (2006.01) |
| *F16J 15/34* | (2006.01) |

(52) U.S. Cl.
CPC .......... *F01D 11/005* (2013.01); *F01D 11/025* (2013.01); *F16J 15/0887* (2013.01); *F16J 15/3456* (2013.01); *F05D 2220/32* (2013.01); *F05D 2240/55* (2013.01); *F05D 2250/75* (2013.01)

(58) Field of Classification Search
CPC ....... F01D 11/005; F01D 11/025; F16J 15/02; F16J 15/0887; F16J 15/3456; F16J 15/025; F16J 15/067
See application file for complete search history.

(56) References Cited

U.S. PATENT DOCUMENTS

| | | | |
|---|---|---|---|
| 4,642,024 | A | 2/1987 | Weidner |
| 5,380,150 | A | 1/1995 | Stahl |
| 5,927,942 | A | 7/1999 | Stahl |
| 8,016,297 | B2 | 9/2011 | Heinemann |
| 8,651,497 | B2 | 2/2014 | Tholen |
| 9,341,072 | B2 * | 5/2016 | Hanumanthan ....... F01D 11/005 |
| 2006/0082074 | A1 | 4/2006 | Synnott |
| 2013/0266416 | A1 | 10/2013 | Bergman et al. |
| 2013/0323033 | A1 | 12/2013 | Lutjen |
| 2014/0157757 | A1 | 6/2014 | Hasel |
| 2014/0186163 | A1 | 7/2014 | Clouse |
| 2014/0248127 | A1 | 9/2014 | Chuong |

* cited by examiner

*Primary Examiner* — Christopher Verdier
*Assistant Examiner* — Sabbir Hasan
(74) *Attorney, Agent, or Firm* — Getz Balich LLC

(57) ABSTRACT

A seal assembly extends along an axis and seals an axial (and/or radial) gap between a first component and a second component. The seal assembly includes a seal carrier and a seal element. The seal element extends axially (and/or radially) between a first portion and a second portion. The first portion of the seal element is slidingly arranged within a slot in an axial end (or a radial side) of the seal carrier. The second portion of the seal element is configured to axially (and/or radially) engage the second component.

14 Claims, 7 Drawing Sheets

US 11,073,034 B2

SEAL ASSEMBLY FOR SEALING AN AXIAL GAP BETWEEN COMPONENTS

This application is a divisional application of U.S. patent application Ser. No. 14/866,197 filed Sep. 25, 2015 and claims priority to U.S. Provisional Patent Application No. 62/055,352 filed Sep. 25, 2014, both of which are hereby incorporated herein by reference in their entirety.

BACKGROUND OF THE INVENTION

1. Technical Field

This disclosure relates generally to a seal assembly for sealing an axial gap between components.

2. Background Information

It is known in the art to use a seal such as a w-seal to seal an axial gap between two neighboring components. A typical w-seal, however, may be prone to leakage where the neighboring components shift relative to one another and/or have intermittent loading points.

There is a need in the art therefore for an improved assembly for sealing an axial gap between neighboring components.

SUMMARY OF THE DISCLOSURE

According to an aspect of the invention, an assembly is provided for a turbine engine. This turbine engine assembly includes a turbine engine first component, a turbine engine second component and an annular seal assembly. The seal assembly extends along an axis and seals an axial gap between the first and the second components. The seal assembly includes a seal carrier and a seal element. The seal element extends between a first portion and a second portion. The first portion is slidingly arranged within a slot in an axial end of the seal carrier. The second portion axially engages the second component.

According to another aspect of the invention, a seal assembly is provided that extends along an axis and seals (e.g., an axial and/or radial) gap extending in a (e.g., axial and/or radial) direction between a first component and a second component. The seal assembly includes an annular seal carrier and an annular seal element extending in the direction between a first portion and a second portion. The first portion is slidingly arranged within a slot in a first region (e.g., an axial end or radial side) of the seal carrier. The second portion is configured to (e.g., axially and/or radially) engage the second component along the direction.

According to still another aspect of the invention, another assembly is provided for a turbine engine. This turbine engine assembly includes a turbine engine first component, a turbine engine second component and an annular seal assembly. The seal assembly extends along an axis and seals a radial gap between the first and the second components. The seal assembly includes a seal carrier and a seal element. The seal element extends between a first portion and a second portion. The first portion is slidingly arranged within a slot in a radial side of the seal carrier. The second portion radially engages the second component.

The direction may include an axial component and/or a radial component.

An annular second seal element may be included and extend between a first portion and a second portion. The first portion of the second seal element may be slidingly arranged within a second slot in a second region of the seal carrier opposite the first region along the direction. The second portion of the second seal element may be configured to engage the first component along the direction.

A rope seal may be included and disposed within a channel in a second region of the seal carrier opposite the first region along the direction. The rope seal may be configured to seal the seal carrier with the first component.

The slot may extend axially and radially inward into the seal element from the axial end.

An included angle between the second portion of the seal element and the second component may be an acute angle.

The second portion of the seal element may contact the second component.

The seal assembly may include a shield element disposed between the second portion of the seal element and the second component.

The shield element may contact the second portion of the seal element and the second component.

The seal assembly may include a rope seal disposed between and contacting the shield element and the second component.

The seal assembly may include a spring element that biases the second portion of the seal element axially away from the seal carrier and towards the second component.

The seal assembly may include a spring element that biases at least a portion of the seal carrier axially away from the second component.

A second axial end of the seal carrier may axially contact the first component.

The seal assembly may include a rope seal disposed axially between and contacting the seal carrier and the first component.

The seal assembly may include a second seal element extending axially between a first portion and a second portion. The first portion of the second seal element may be slidingly arranged within a second slot in a second axial end of the seal carrier. The second portion of the second seal element may axially engage the first component.

The seal assembly may include a second seal element extending axially between a first portion and a second portion. The first portion of the second seal element may be slidingly arranged within a second slot in the axial end of the seal carrier. The second portion of the second seal element may axially engage the second component.

The seal element may extend axially between the second portion and a third portion. The third portion may be slidingly arranged within a second slot in the axial end of the seal carrier. The first and the third portions may form substantially parallel seal element legs.

The seal assembly may be formed from sheet material; e.g., sheet metal.

One of the components may be configured as or otherwise include a blade outer air seal. The other one of the components may be configured as or otherwise include a platform of a stator vane array.

The foregoing features and the operation of the invention will become more apparent in light of the following description and the accompanying drawings.

DETAILED DESCRIPTION OF THE INVENTION

Figure 1:
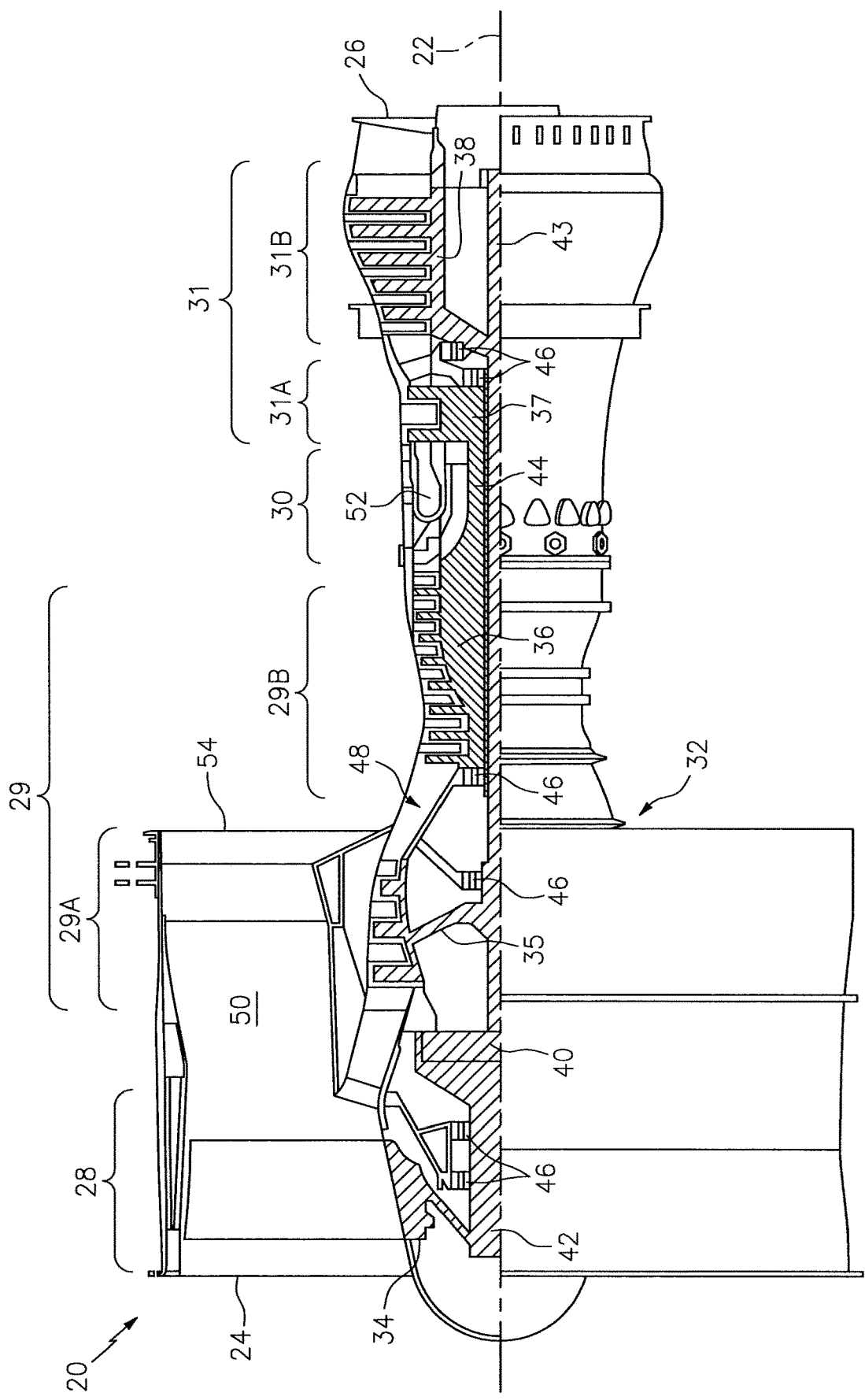
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31 are arranged sequentially along the centerline 22 within an engine housing 32. Each of the engine sections 28, 29A, 29B, 31A and 31B includes a respective rotor 34-38. Each of these rotors 34-38 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 34 is connected to a gear train 40, for example, through a fan shaft 42. The gear train 40 and the LPC rotor 35 are connected to and driven by the LPT rotor 38 through a low speed shaft 43. The HPC rotor 36 is connected to and driven by the HPT rotor 37 through a high speed shaft 44. The shafts 42-44 are rotatably supported by a plurality of bearings 46; e.g., rolling element and/or thrust bearings. Each of these bearings 46 is connected to the engine housing 32 by at least one stationary structure such as, for example, an annular support strut.

During operation, air enters the turbine engine 20 through the airflow inlet 24, and is directed through the fan section 28 and into a core gas path 48 and a bypass gas path 50. The air within the core gas path 48 may be referred to as "core air". The air within the bypass gas path 50 may be referred to as "bypass air". The core air is directed through the engine sections 29-31, and exits the turbine engine 20 through the airflow exhaust 26 to provide forward engine thrust. Within the combustor section 30, fuel is injected into a combustion chamber 52 and mixed with the core air. This fuel-core air mixture is ignited to power the turbine engine 20. The bypass air is directed through the bypass gas path 50 and out of the turbine engine 20 through a bypass nozzle 54 to provide additional forward engine thrust. Alternatively, at least some of the bypass air may be directed out of the turbine engine 20 through a thrust reverser to provide reverse engine thrust.

Figure 2:
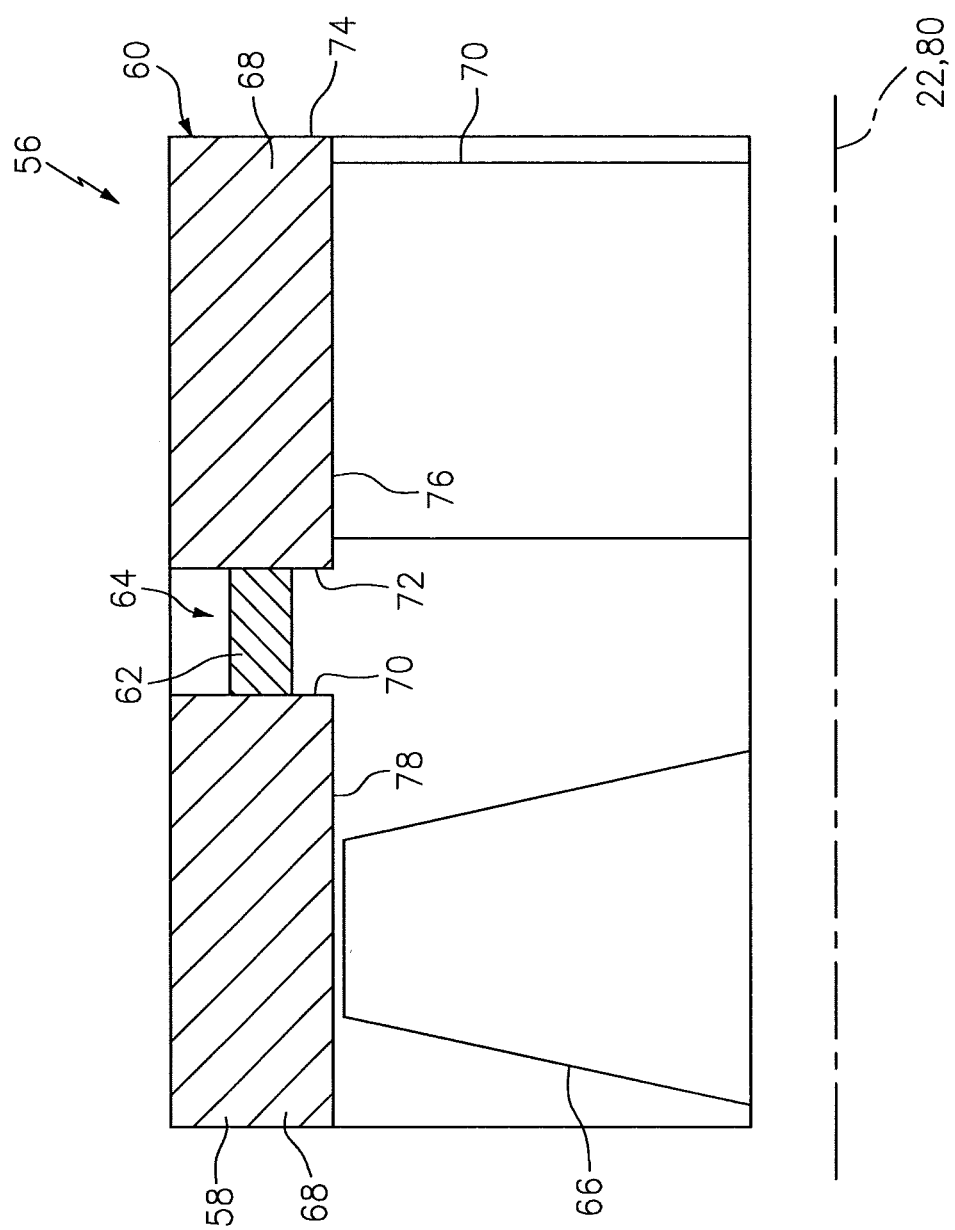
FIG. 2 is a block illustration of an assembly for the turbine engine.

FIG. 2 illustrates an assembly 56 for the turbine engine 20. This turbine engine assembly 56 includes a turbine engine first component 58 and a turbine engine second component 60. The turbine engine assembly 56 also includes an annular seal assembly 62 which extends axially between and substantially seals an axial gap 64 between the first and the second components 58 and 60.

For ease of description, the first component 58 is described below as a blade outer air seal (BOAS) and the second component 60 is described as a stator vane (or guide vane) assembly. The present disclosure, however, is not limited to such an arrangement or such turbine engine components. For example, the first component 58 may be a stator vane (or guide vane) assembly and the second component 60 may be a blade outer air seal. In another example, the first and the second components 58 and 60 may be turbine engine cases and/or any type of static turbine engine structures which utilize an axial seal therebetween. Furthermore, the seal assembly 82 may seal a gap between neighboring components configured within rotational or non-rotational equipment other than a turbine engine.

Referring again to FIG. 2, the blade outer air seal 58 may be an abradable or non-abradable blade outer air seal. The blade outer air seal 58 is axially aligned with an array of rotor blades 66 (e.g., compressor or turbine blades) included in a respective one of the rotors 34-38 (e.g., the compressor or turbine rotor; see FIG. 1). The blade outer air seal 58 circumscribes the respective rotor and is configured to reduce or substantially eliminate leakage over tips of the rotor blades 66. The blade outer air seal 58 extends circumferentially around the centerline 22. The blade outer air seal 58 extends axially along the centerline 22 between an upstream axial end 68 and a downstream axial end 70. The blade outer air seal 58 may be formed as a single unitary hoop. Alternatively, the blade outer air seal 58 may be formed from an array of BOAS segments disposed about the centerline 22.

The stator vane assembly 60 includes an outer platform 68 and an array of stator vanes 70 (or guide vanes) which project radially inward from the outer platform 68. The outer platform 68 extends circumferentially around the centerline 22. The outer platform 68 extends axially along the centerline 22 between an upstream axial end 72 and a downstream axial end 74. A radial inner surface 76 of the outer platform 68 may be substantially radially aligned with a radial inner surface 78 of the blade outer air seal 58. The upstream axial end 72 is located proximate the downstream axial end 70, thereby forming the axial gap 64 therebetween. The outer platform 68 may be formed as a single unitary hoop. Alternatively, the outer platform 68 may be formed from an array of outer platform segments disposed about the centerline 22. These segments may be circumferentially aligned with or offset from the BOAS segments.

The seal assembly 62 extends circumferentially around an axis 80 which may be substantially co-linear with the centerline 22. The seal assembly 62 extends axially along the axis 80. The seal assembly 62 is arranged axially between and sealingly engages (e.g., contacts) the axial ends 70 and 72. The seal assembly 62 thereby substantially seals the axial gap 64 between the blade outer air seal 58 and the outer platform 68.

The seal assembly 62 may have various configurations as described below and illustrated in the drawings. While certain components of the seal assembly 62 are described below as engaging or being proximate either the blade outer air seal 58 or the outer platform 68, it is worth noting these arrangements may be reversed or duplicated in alternative embodiments. It is also worth noting one or more of the seal assembly 62 components described below may each be formed as a continuous full hoop, or alternatively as a split hoop or ring; e.g., a full hoop with a split at one circumferential location. For example, the seal carrier (e.g., 82) described below may be formed as a continuous full hoop and one or more of the seal elements (e.g., 84) described below may each be formed from as a split hoop. Ends defining the split in the seal element(s) may also include overlapping portions to reduce leakage therebetween. Of course, the present disclosure is not limited to the foregoing exemplary embodiment; e.g., the seal carrier may be formed as a split hoop and/or one or more of the seal elements may each be formed as a continuous full hoop.

Figure 3:
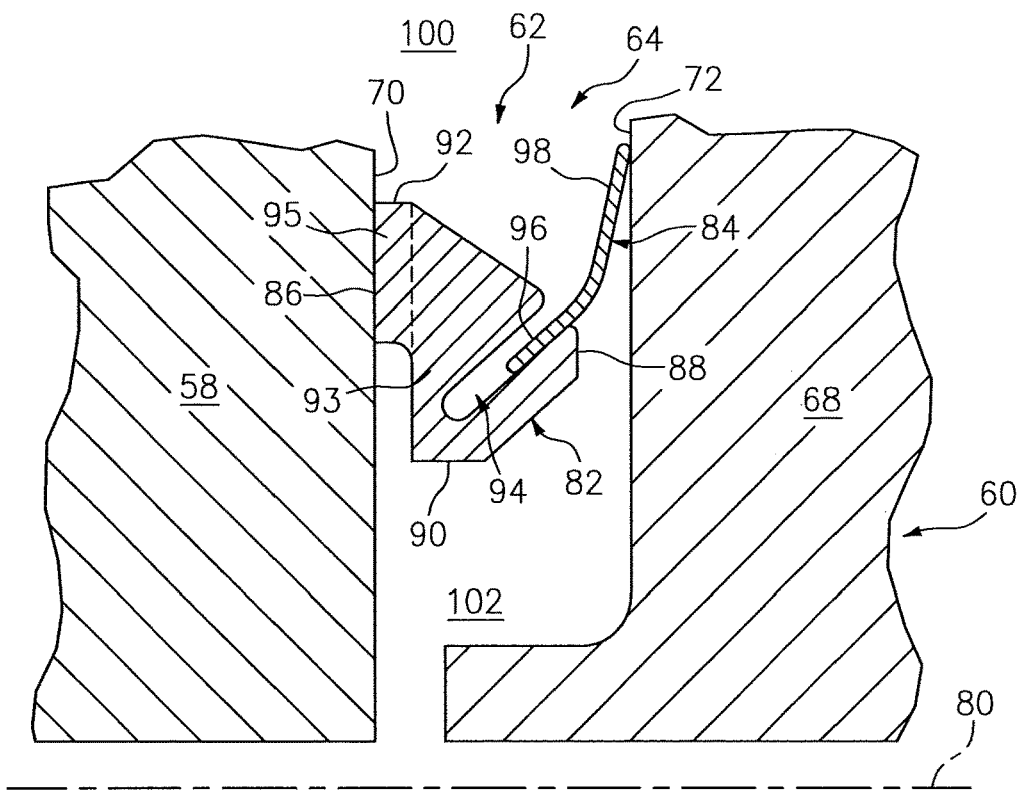
FIGS. 3-12 are partial side sectional illustrations of various embodiments of a seal assembly between a plurality of turbine engine components.

Referring to FIG. 3, the seal assembly 62 includes an annular seal carrier 82 and an annular seal element 84. The seal carrier 82 extends circumferentially around the axis 80. The seal carrier 82 extends axially along the axis 80 between an upstream axial end 86 and a downstream axial end 88. The seal carrier 82 extends radially between a radial inner side 90 and a radial outer side 92. The seal carrier 82 includes a base 93 and a land 95 that sealingly engages the axial end 70. The land 95 projects axially out from the base 93 to the axial end 86, and may be located at (e.g., on, adjacent or proximate) an outer radial corner of the base 93. An annular slot 94 extends into the seal carrier base 93 from its axial end 88, and may be located at or generally towards an inner radial corner of the base 93. More particularly, the slot 94 extends axially and radially inward into the seal element 84 from the axial end 88.

The seal element 84 extends axially and/or radially between a first portion 96 (e.g., an inner leg) and a second portion 98 (e.g., an outer leg). The first portion 96 is configured to sealingly engage the seal carrier 82. The first portion 96 of FIG. 3, for example, is slidingly arranged within the slot 94 and sealingly contacts the seal carrier 82. The second portion 98 projects axially and/or radially out from the first portion 96. The second portion 98 is configured to sealingly engage the outer platform 68. The second portion 98 of FIG. 3, for example, axially contacts the axial end 72 of the outer platform 68.

During operation, gas pressure in a cavity 100 radially above the seal assembly 62 may be higher than gas pressure in a cavity 102 radially below the seal assembly 62. This pressure differential may cause the land 95 to press axially against and form a seal with the axial end 70 of the blade outer air seal 58. The pressure differential may cause the second portion 98 to press axially against and form a seal with the axial end 72 of the outer platform 68. The pressure differential may also cause the first portion 96 to press radially down against and form a seal with the seal carrier 82. In this manner, the seal assembly 62 may substantially seal the axial gap 64 between the blade outer air seal 58 and the outer platform 68.

Thermal and/or mechanical loads and/or part tolerances may cause slight axial and/or radial shifts between the blade outer air seal 58 and the outer platform 68. To accommodate these shifts, the first portion 96 of the seal element 84 may slide within the slot 94 while substantially maintaining the seal between the seal element 84 and the seal carrier 82. This sliding enables the seal assembly 62 to axially compress and expand in response to changes in axial displacement between the components 58 and 68. For example, where more of the seal element 84 slides into the slot 94 and/or the seal element 84 deflects, the seal assembly 62 may axially compress. In contrast, where some of the seal element 84 slides out of the slot 94 and/or the seal element 84 relaxes (e.g., un-deflects), the seal assembly 62 may axially expand. In a similar manner, the sliding of the seal element 84 facilitates relative radial motion between the seal assembly components 82 and 84 and, thus, between the turbine engine components 58 and 68.

It is worth noting, the seal assembly 62 may be designed to promote movement (e.g., sliding) between the seal element 84 and the seal carrier 82 over movement between one of the seal assembly components 82 and 84 and a respective one of the turbine engine components 58 and 68. This may be accomplished, for example, by applying a lubricant (e.g., dry film lubricant) to the seal carrier 82 within the slot 94 and/or to the first portion 96 of the seal element 84. This may also or alternatively be accomplished by forming the seal element 84 and/or the seal carrier 82 from a material with a relatively low coefficient of friction, for example, Haynes 188 metal. One or both of the turbine engine components 58 and 68 may be formed from metals such as, but not limited to, Inconel ES 718 metal, Waspaloy metal or PWA 1484 SX metal. One or more of the seal assembly 62 components and/or turbine engine components 58 and 60 (e.g., 68), of course, may be formed from one or more other materials than those described above.

Figure 4:
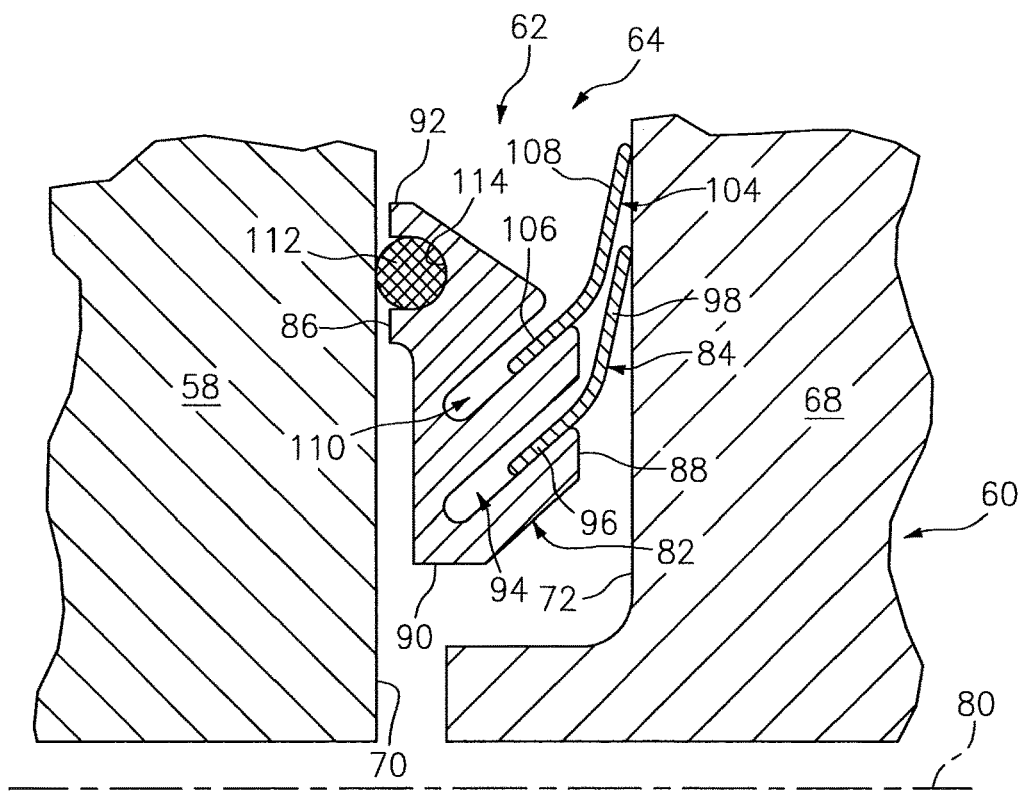

Referring to FIG. 4, in some embodiments, the seal assembly 62 may include a plurality of seal elements (e.g., 84 and 104) configured for forming a seal between the seal carrier 82 and the outer platform 68. The seal assembly 62 of FIG. 4, for example, includes another annular seal element 104. This seal element 104 extends axially and/or radially between a first portion 106 (e.g., an inner leg) and a second portion 108 (e.g., an outer leg). The first portion 106 is configured to sealingly engage the seal carrier 82. The first portion 106 of FIG. 4, for example, is slidingly arranged within another (e.g., radially outer) slot 110 in the seal carrier 82 and sealingly contacts the seal carrier 82. The second portion 108 projects axially and/or radially out from the first portion 106. The second portion 108 is configured to sealingly engage the outer platform 68. The second portion 108 of FIG. 4, for example, axially contacts the axial end 72 of the outer platform 68.

Still referring to FIG. 4, in some embodiments, the seal assembly 62 may include a seal element such as a rope seal 112 for forming a seal between the seal carrier 82 and the blade outer air seal 58. The rope seal 112 of FIG. 4 is disposed within an annular channel 114, which extends axially into the seal carrier 82 from the axial end 86. The rope seal 112 is configured to form an axial seal between and contact the seal carrier 82 and the blade outer air seal 58. Note, such a rope seal 112 may accommodate some stair stepping between segments of the blade outer air seal 58.

Figure 5:
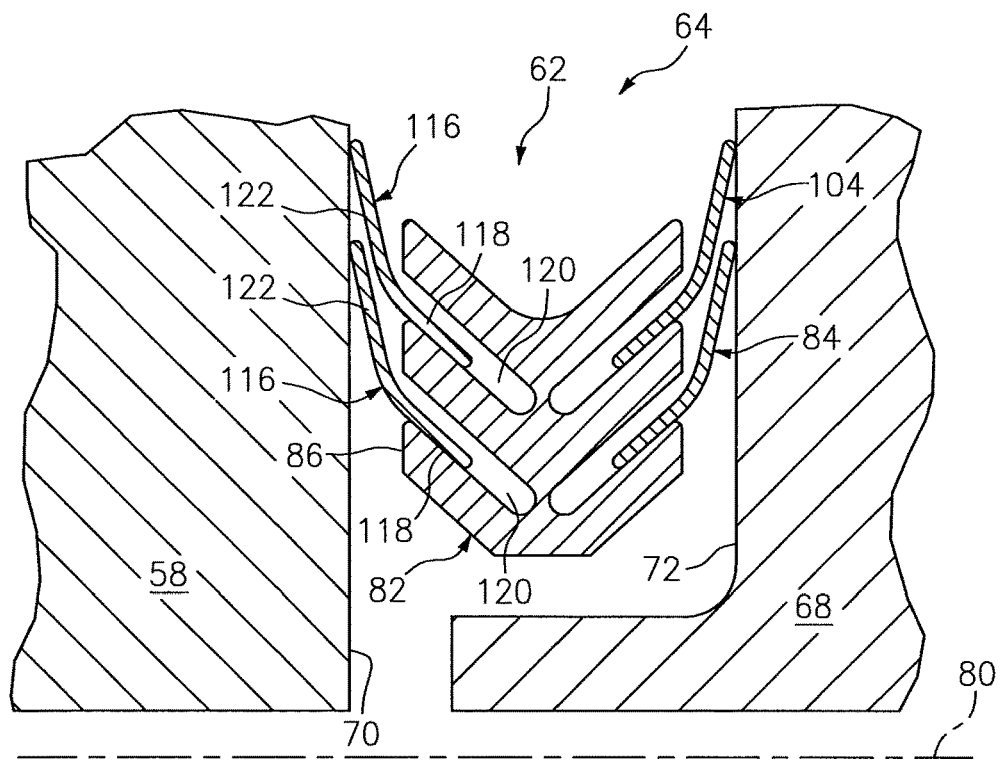

Alternatively, referring to FIG. 5, the rope seal 112 of FIG. 4 may be replaced by one or more annular seal elements 116. These seal elements 116 may be configured similar to the seal elements 84 and 104, except arranged on the opposite axial end 86 of the seal carrier 82. For example, first portions 118 (e.g., inner legs) of the seal elements 116 may be respectively slidingly arranged within slots 120 in the axial end 86 and sealingly contact the seal carrier 82. Second portions 122 (e.g., outer legs) of the seal elements 116 may respectively project axially and/or radially out from the first portions 118. The second portions 122 may further be configured to sealingly engage the blade outer air seal 58; e.g., axially contact the axial end 70 of the blade outer air seal 58.

Figure 6:
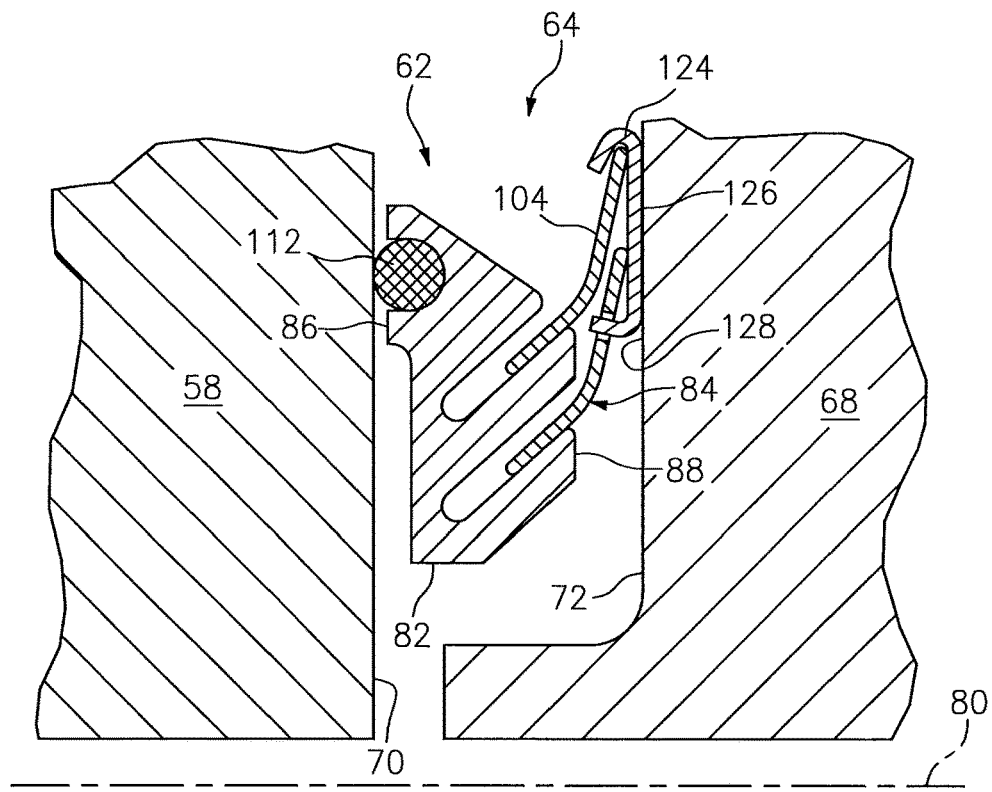

Referring to FIG. 6, in some embodiments, the seal assembly 62 may include an annular shield element 124; e.g., a wear shield and/or a thermal shield. The shield element 124 may be configured with a radially elongated surface 126, which may be substantially parallel with an opposing surface 128 on the axial end 72 of the outer platform 68. In this manner, the shield element 124 may replace annular line contacts between the seal elements 84 and 104 and the outer platform 68 with an annular area contact between the shield element 124 and the outer platform 68. The shield element 124 therefore may provide a wear buffer between the seal elements 84 and 104 and the outer platform 68; e.g., the shield element 124 may provide a replaceable wear element. The shield element 124 may also provide a thermal buffer for elements 84 and 104 by providing a thermal resistance to a conductive heat load from the outer platform 68.

Figure 7:
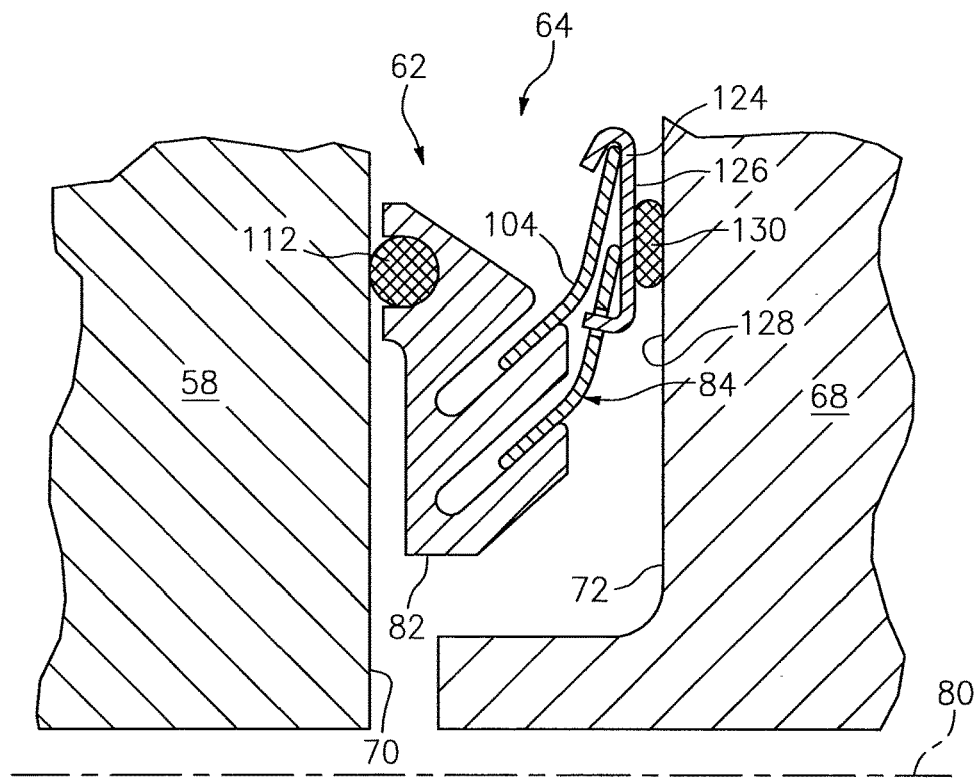

Referring to FIG. 7, in some embodiments, the seal assembly 62 may include another seal element such as a rope seal 130. This rope seal 130 may be arranged to form a seal between and contact the shield element 124 and the outer platform 68.

Figure 8:
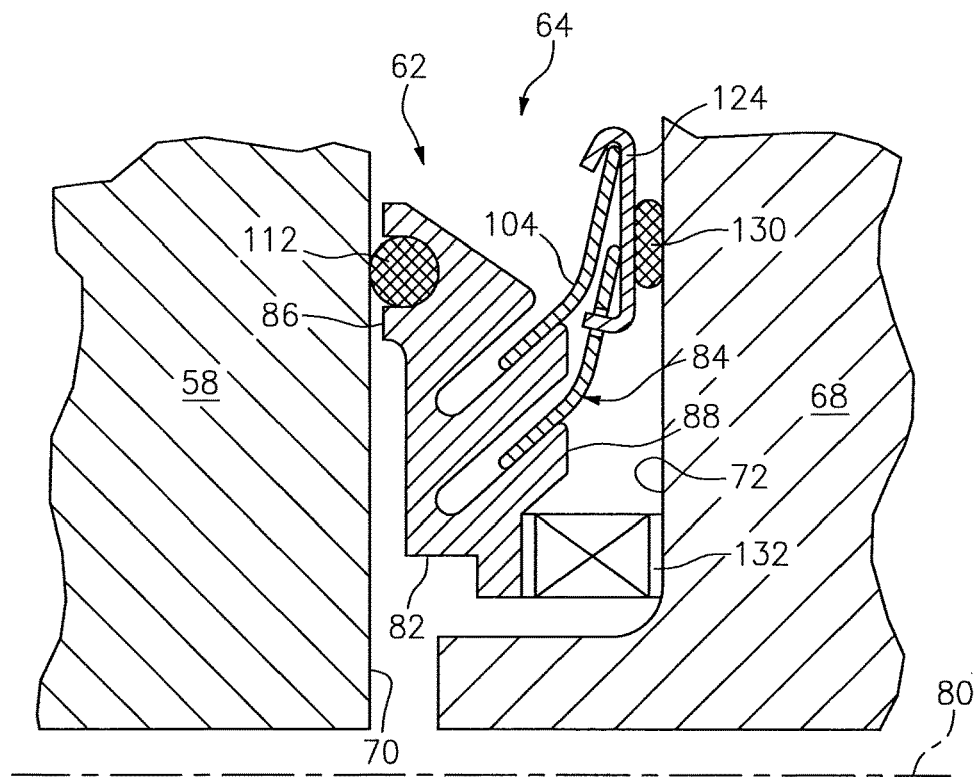

Referring to FIG. 8, in some embodiments, the seal assembly 62 may include a spring element 132 (e.g., a wave spring). This spring element 132 may be arranged axially between and engage the seal carrier 82 and the outer platform 68. The spring element 132 therefore may bias the axial end 88 axially away from the axial end 72 as well as bias the axial end 86 axially towards the axial end 70. Biasing the axial ends 70 and 86 towards one another may increase sealing effectiveness of the rope seal 112, particularly where the pressure differential across the seal assembly 62 is relatively small.

Figure 9:
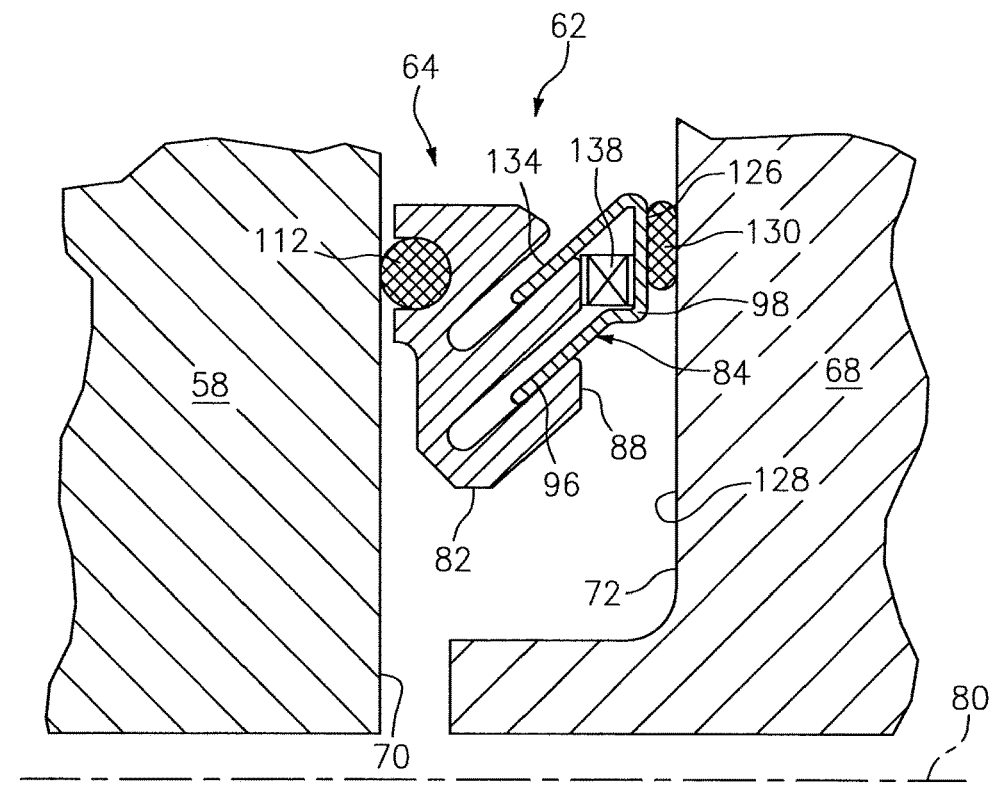

Referring to FIG. 9, in some embodiments, the second portion 98 of the seal element 84 may be configured as a shield element. The second portion 98 of the seal element 84, for example, may be configured with the elongated surface 126, which may be substantially parallel with the opposing surface 128 on the axial end 72 of the outer platform 68. The second portion 98 of FIG. 9 is sealingly engaged with the outer platform 68 through the rope seal 130. However, in other embodiments, the second portion 98 may directly contact and seal against the outer platform 68. The seal element 84 may also include a third portion 134 (e.g., a leg), which projects out from the second portion 98 and is substantially parallel with the first portion 96. This third portion 134 may be slidingly arranged within a slot 136 in the axial end 88 of the seal carrier 82.

Still referring to FIG. 9, the seal assembly 62 may include a spring element 138 (e.g., a wave spring) arranged axially between and engaged with the seal carrier 82 and the outer platform 68. This spring element 138 therefore may bias the axial end 88 axially away from the second portion 98 as well as bias the second portion 98 axially towards the axial end 72. Biasing the second portion 98 and the axial end 72 towards one another may increase sealing effectiveness of the rope seal 130, particularly where the pressure differential across the seal assembly 62 is relatively small.

Figure 12:
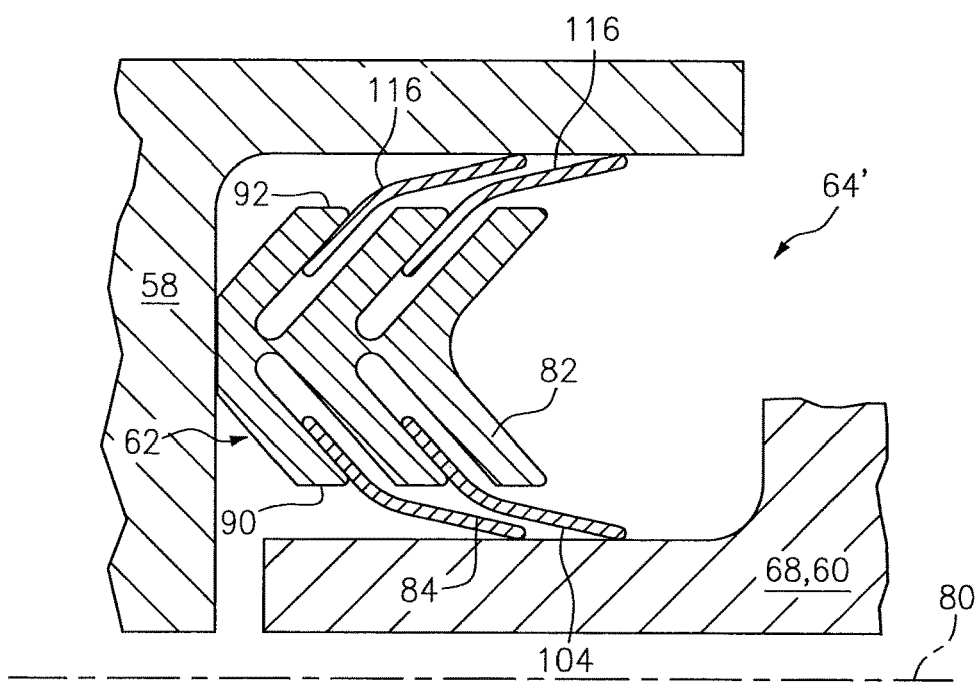

In some embodiments, the seal assembly 62 may be configured in orientations other than that described above. For example, referring to FIG. 12, the seal elements 116 may be arranged radially about the seal carrier 82 and the seal elements 84 and 104 may be arranged radially within the seal carrier 82, or vice versa. Thus, the seal elements 84 and 104, 116 are respectively arranged on opposing radial sides 90 and 92 of the seal carrier 82, rather than on opposing axial ends of the seal carrier 62 as described above. The seal assembly 62 therefore extends radially between and seals a radial gap 64' between the components 58 and 68. In this embodiment, one or more of the seal elements 84, 104 and 116 may slide within the seal carrier's 82 slots to accommodate movement between the components 58 and 68. It is worth noting, the other seal assembly 62 embodiments described above may also be configured in such an alternative orientation.

Figure 10:
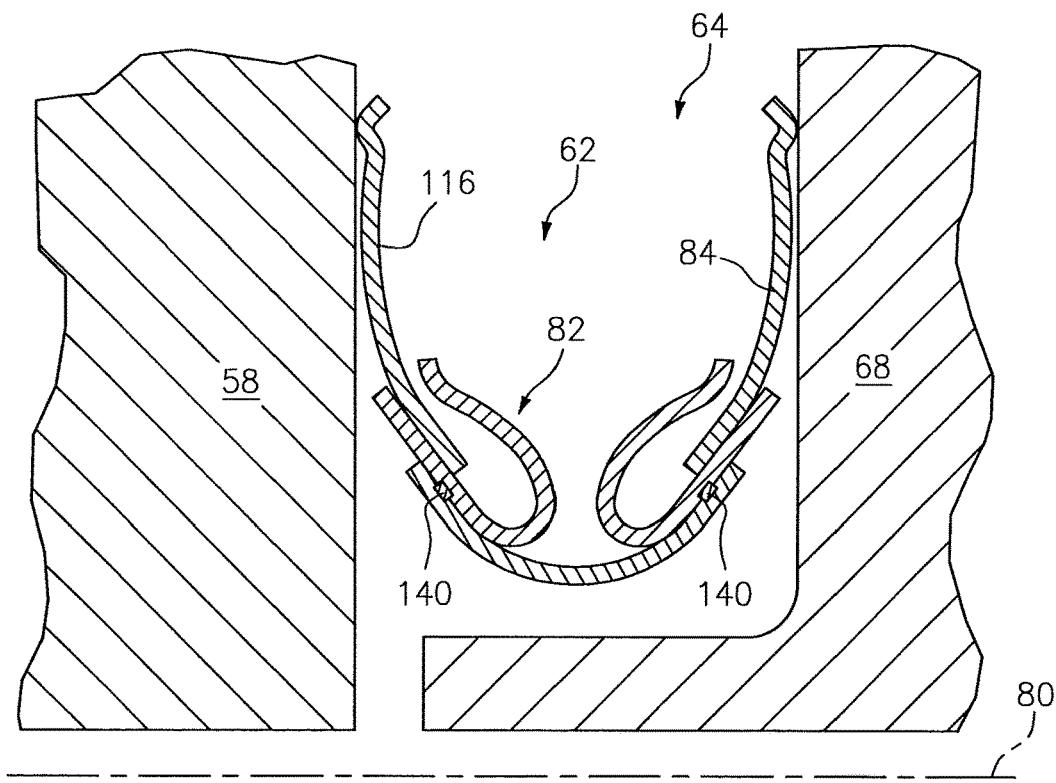
Figure 11:
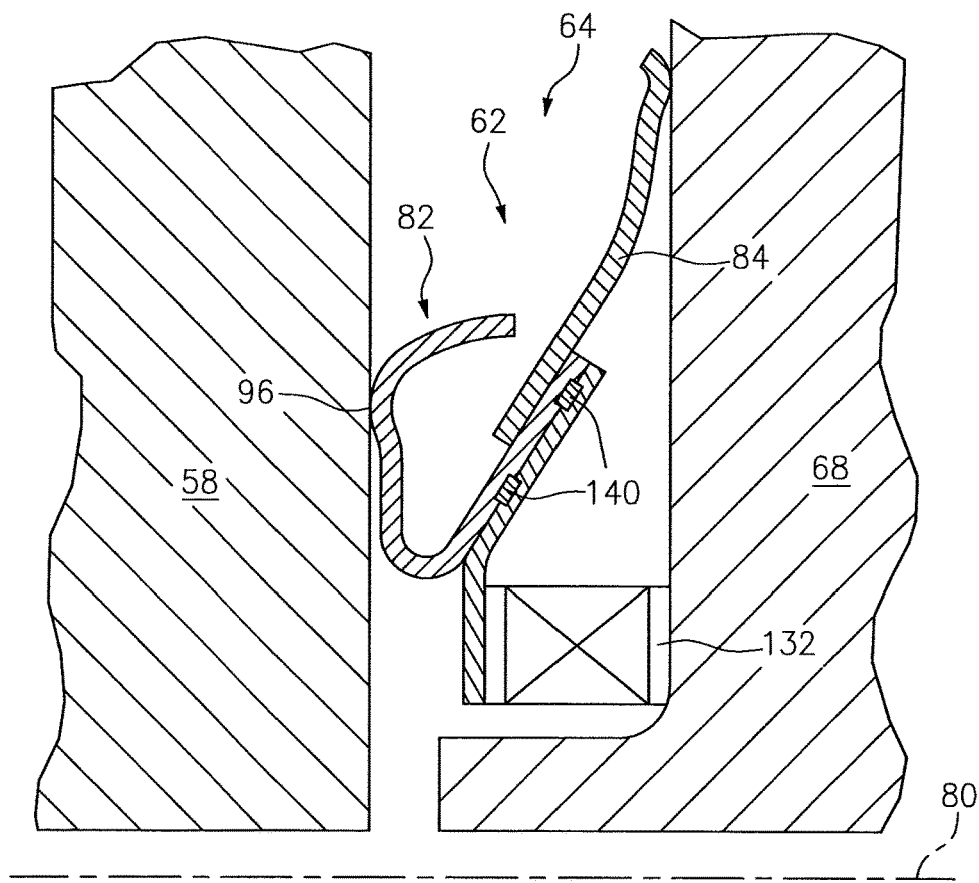

The sealing assembly 62 components may be manufactured using one or more processes. The seal elements 84, 104 and/or 116, for example, may be formed by bending and cutting sheet material; e.g., sheet metal. The seal carrier 82 may also be formed by bending and cutting sheet material (e.g., sheet metal) as illustrated in FIGS. 10 and 11. One or more discretely formed pieces of the sheet material may also be bonded together at one or more points 140 to form, for example, the seal carrier 82. Alternatively, the seal carrier 82 and/or other seal assembly components (e.g., 84, 104 and/or 116) may be formed by casting, machining, forging, milling, etc. The present disclosure, of course, is not limited to any particular seal assembly component formation processes.

The terms "upstream", "downstream", "inner" and "outer" are used to orientate the components of the seal assembly 62 described above relative to the turbine engine 20 and its centerline 22. A person of skill in the art will recognize, however, one or more of these components may be utilized in other orientations than those described above. The present invention therefore is not limited to any particular seal assembly 62 spatial orientations.

The seal assembly 62 may be included in various turbine engines other than the one described above as well as in other types of rotational and non-rotational equipment. The seal assembly 62, for example, may be included in a geared turbine engine where a gear train connects one or more shafts to one or more rotors in a fan section, a compressor section and/or any other engine section. Alternatively, the seal assembly 62 may be included in a turbine engine configured without a gear train. The seal assembly 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, comprising:
   a turbine engine first component;
   a turbine engine second component; and
   an annular seal assembly extending along an axis and sealing a radial gap between the first component and the second component;
   the annular seal assembly including a seal carrier and a seal element;
   the seal element extending between a first portion and a second portion;
   the first portion slidingly arranged within a slot in a radial side of the seal carrier; and
   the second portion radially engaging the second component;
   wherein the annular seal assembly further includes a second seal element extending between a first portion and a second portion;
   wherein the first portion of the second seal element is slidingly arranged within a second slot in a second radial side of the seal carrier; and
   wherein the second portion of the second seal element radially engages the first component.

2. The assembly of claim 1, wherein the slot extends axially and radially inward into the seal element from the radial side.

3. The assembly of claim 1, wherein an included angle between the second portion of the seal element and the second component is an acute angle.

4. The assembly of claim 1, wherein the second portion of the seal element contacts the second component.

5. The assembly of claim 1, wherein an axial end of the seal carrier axially contacts the first component.

6. An assembly for a turbine engine, comprising:
a turbine engine first component;
a turbine engine second component; and
an annular seal assembly extending along an axis and sealing a radial gap between the first component and the second component;
the annular seal assembly including a seal carrier and a seal element;
the seal element extending between a first portion and a second portion;
the first portion slidingly arranged within a slot in a radial side of the seal carrier; and
the second portion radially engaging the second component
wherein the annular seal assembly further includes a second seal element extending between a first portion and a second portion;
wherein the first portion of the second seal element is slidingly arranged within a second slot in the radial side of the seal carrier; and
wherein the second portion of the second seal element radially engages the second component.

7. The assembly of claim 6, wherein the slot extends axially and radially inward into the seal element from the radial side.

8. The assembly of claim 6, wherein an included angle between the second portion of the seal element and the second component is an acute angle.

9. The assembly of claim 6, wherein the second portion of the seal element contacts the second component.

10. The assembly of claim 6, wherein an axial end of the seal carrier axially contacts the first component.

11. An assembly for a turbine engine, comprising:
a first component of the turbine engine;
a second component of the turbine engine; and
an annular seal assembly extending along an axis and sealing a radial gap between the first component and the second component;
the annular seal assembly including a seal carrier and a seal element;
the seal element extending between a first portion and a second portion;
the first portion projecting into a slot in a radial side of the seal carrier; and
the second portion radially contacting the second component;
wherein the annular seal assembly further includes a second seal element extending between a first portion and a second portion;
wherein the first portion of the second seal element projects into a second slot in a second radial side of the seal carrier; and
wherein the second portion of the second seal element radially contacts the first component.

12. The assembly of claim 11, wherein the slot extends axially and radially inward into the seal element from the radial side.

13. The assembly of claim 11, wherein an included angle between the second portion of the seal element and the second component is an acute angle.

14. The assembly of claim 11, wherein an axial end of the seal carrier axially contacts the first component.

* * * * *